W. J. GUDERIAN.
CISTERN FILTER, VENTILATOR, AND WATER PURIFIER.
APPLICATION FILED SEPT. 19, 1912.

1,059,935.

Patented Apr. 22, 1913.

2 SHEETS—SHEET 1.

WITNESSES

INVENTOR
William J. Guderian
his Attorney

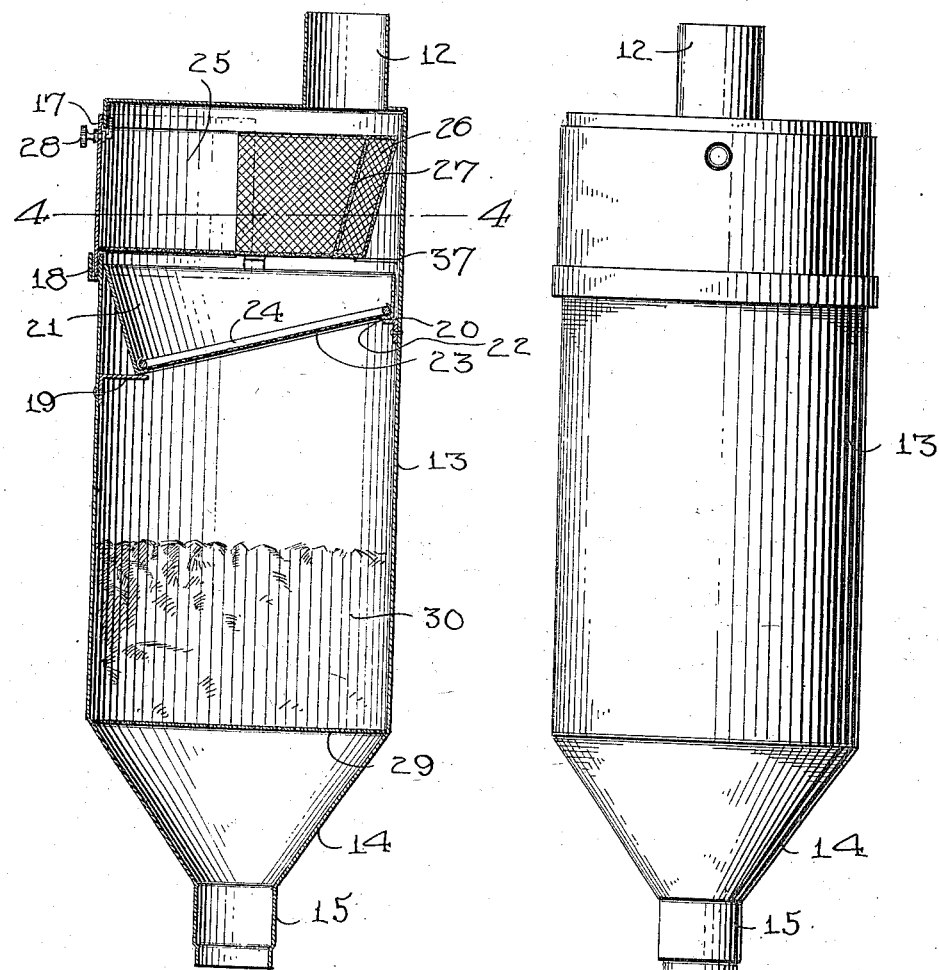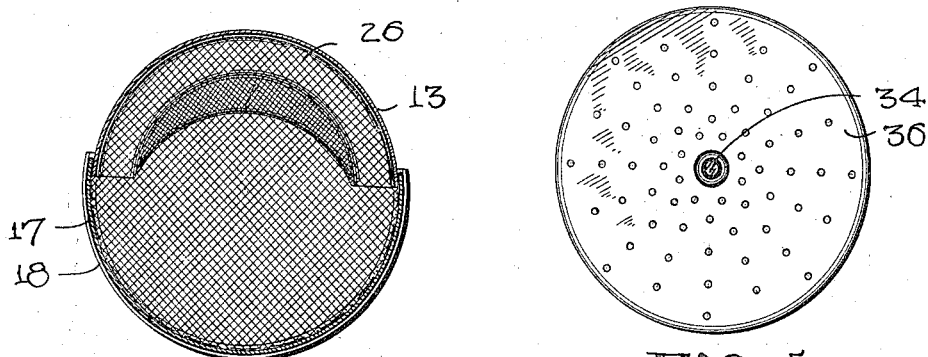

UNITED STATES PATENT OFFICE.

WILLIAM J. GUDERIAN, OF ALGONA, IOWA.

CISTERN FILTER, VENTILATOR, AND WATER-PURIFIER.

1,059,935. Specification of Letters Patent. Patented Apr. 22, 1913.

Application filed September 19, 1912. Serial No. 721,268.

*To all whom it may concern:*

Be it known that I, WILLIAM J. GUDE-RIAN, a citizen of the United States, residing at Algona, in the county of Kossuth and State of Iowa, have invented certain new and useful Improvements in Cistern Filters, Ventilators, and Water-Purifiers, of which the following is a specification, reference being had therein to the accompanying drawing.

This invention relates to cisterns and has special reference to a ventilator and water purifier or filter for cisterns of the type in which rain water is collected from roofs and the cistern filled therewith.

The principal object of this invention is to improve and simplify the general construction of devices of this character.

A second object of the invention is to provide an improved form of filter for such devices.

With the above and other objects in view as will be hereinafter apparent, the invention consists in general of certain novel constructions, combinations and arrangements of parts as will be hereinafter fully described, illustrated in the accompanying drawings, and specifically claimed.

Figure 6:
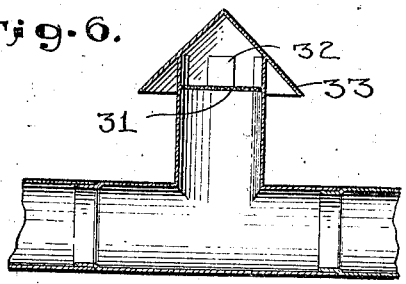
Figure 7:
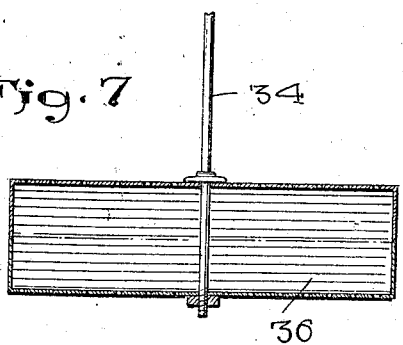
Figure 1:
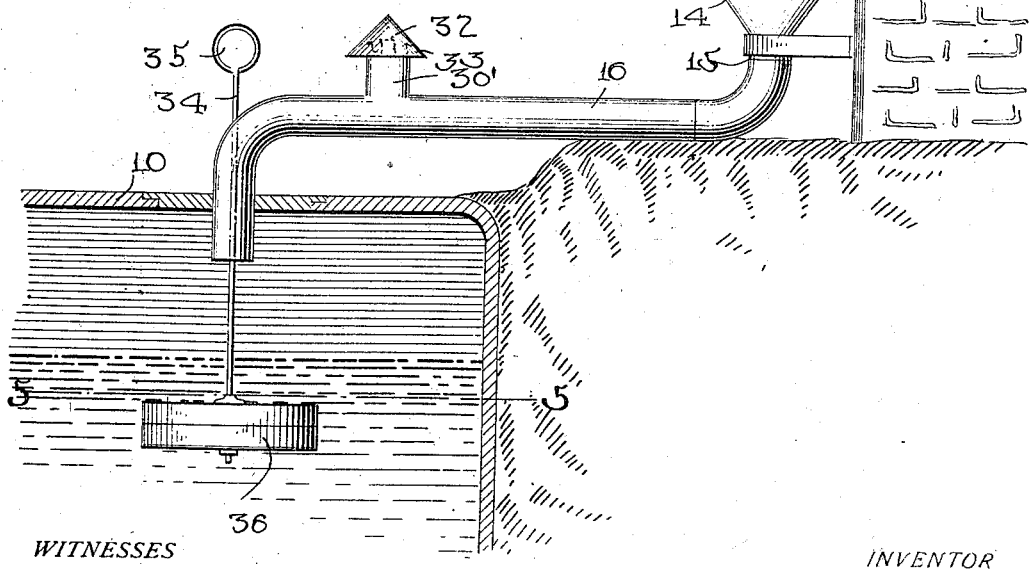

In the accompanying drawings, like characters of reference indicate like parts in the several views, and:—Figure 1 is a side elevation of a device constructed in accordance with this invention. Fig. 2 is an enlarged detail view of the front of the filter. Fig. 3 is a vertical median section of the filter. Fig. 4 is a section on the line 4—4, of Fig. 3. Fig. 5 is a section on the line 5—5, Fig. 1. Fig. 6 is an enlarged detail section through the ventilator. Fig. 7 is an enlarged detail section through the agitator.

This device is used in connection with the usual cistern 10 and rain water spout 11. This rain water spout 11 is connected to the inlet pipe 12 of a filter consisting of a cylindrical body portion 13 terminating at its lower end in an inverted frusto-conical portion 14 from which leads an outlet pipe 15 connected by means of a pipe 16 with the cistern 10. The cylindrical body portion 13 of the filter is provided with an opening 17 having around its lower edge a guard 18. This opening is located just below the top of the filter and below this opening is a shelf or ledge 19, opposite to which but somewhat higher is a second shelf or ledge 20. Resting on the ledges 19 and 20 is a ring made of sheet metal as indicated at 21 and it is to be noted that the front of this ring is frusto-conical while the rear portion is cylindrical, the cone and cylinder merging into each other gradually. Furthermore, it is to be noted that the front of the device is deeper than the rear so that when resting upon these ledges the top edge is horizontal while the bottom edge slopes downward toward the front. On this bottom edge is a flange 22 whereon rests a fabric strainer 23 which is held in position by means of the snap ring or holder 24. Above the ring 24 there is provided a drawer having a solid forward portion 25 and a reticulated rear portion 26 provided with a similar partition 27. The lower edge of the first front rests in the guard 18 while adjacent the upper edge there is provided a turn button 28 which serves to hold the drawer in position. Between the cylindrical portion 13 and the frusto-conical portion 14 is a perforated partition 29 above which I prefer to place a quantity of suitable filtering material 30.

It will be obvious that the reticulated portions of the drawer will catch any twigs or other coarse material that may fall down the rain spout while the strainer will remove the final particles and finally the filter will remove all impurities. It will also be obvious that by reason of the drawer construction and the guard 18, the drawer and strainer may both be taken out and replaced as desired so that they can be readily cleaned. Furthermore, by means of the keeper 24 the cloth may be replaced in the strainer should the same become injured in any way. It is to be noted that the guard 18 will prevent any over-flow of water in the event of the water coming down too fast to pass through the cloth 23.

For the purpose of ventilating the cistern the pipe 16 is provided with a section 30' extending up therefrom, and this section 30' has adjacent its upper end a screen 31 and upwardly projecting fingers 32. Over the fingers 32 is fitted a hood 33, the spaced fingers readily permitting the entrance and escape of air from the pipe 16. Extending downward through the extremity of the pipe 16 which leads into the cistern 10 is a rod 34 having a handle 35 at its upper end and carrying on its lower end a box 36 having a perforated top and bottom. This box 36 affords the agitator for agitating the water, and contains a suitable chemical to dissolve in the water, the perforated top and bottom giving access to the chemical. It is to be noted that the screen ring 21 has extending therefrom a strip 37 whereon the bottom of the drawer rests.

Having thus described the invention, what is claimed as new, is:—

A filter of the class described comprising a body portion having openings at its upper and lower ends, and an opening in its side adjacent the upper end, a guard extending around the bottom edge of the last-mentioned opening, a drawer having a solid forward half adapted to rest in said ledge, and a forwardly projecting reticulated portion arranged to lie beneath the opening in the upper end of the filter, ledges at the front and rear of said filter below said drawer, the ledges at the rear being higher than the ledge at the front, a strainer said drawer, the ledge at the rear being having an inclined bottom resting on said ledges, and a perforated plate at the lower end of said filter.

In testimony whereof I hereunto affix my signature in presence of two witnesses.

WILLIAM J. GUDERIAN.

Witnesses:
CHAS. B. BARRY,
T. P. FARMINGTON.

---

Copies of this patent may be obtained for five cents each, by addressing the "Commissioner of Patents, Washington, D. C."